Sept. 29, 1964
P. H. MOSS ETAL
METHOD FOR THE SIMULTANEOUS PRODUCTION
OF ACYCLIC AND POLYCYCLIC AMINES
Filed May 26, 1961
3,151,115
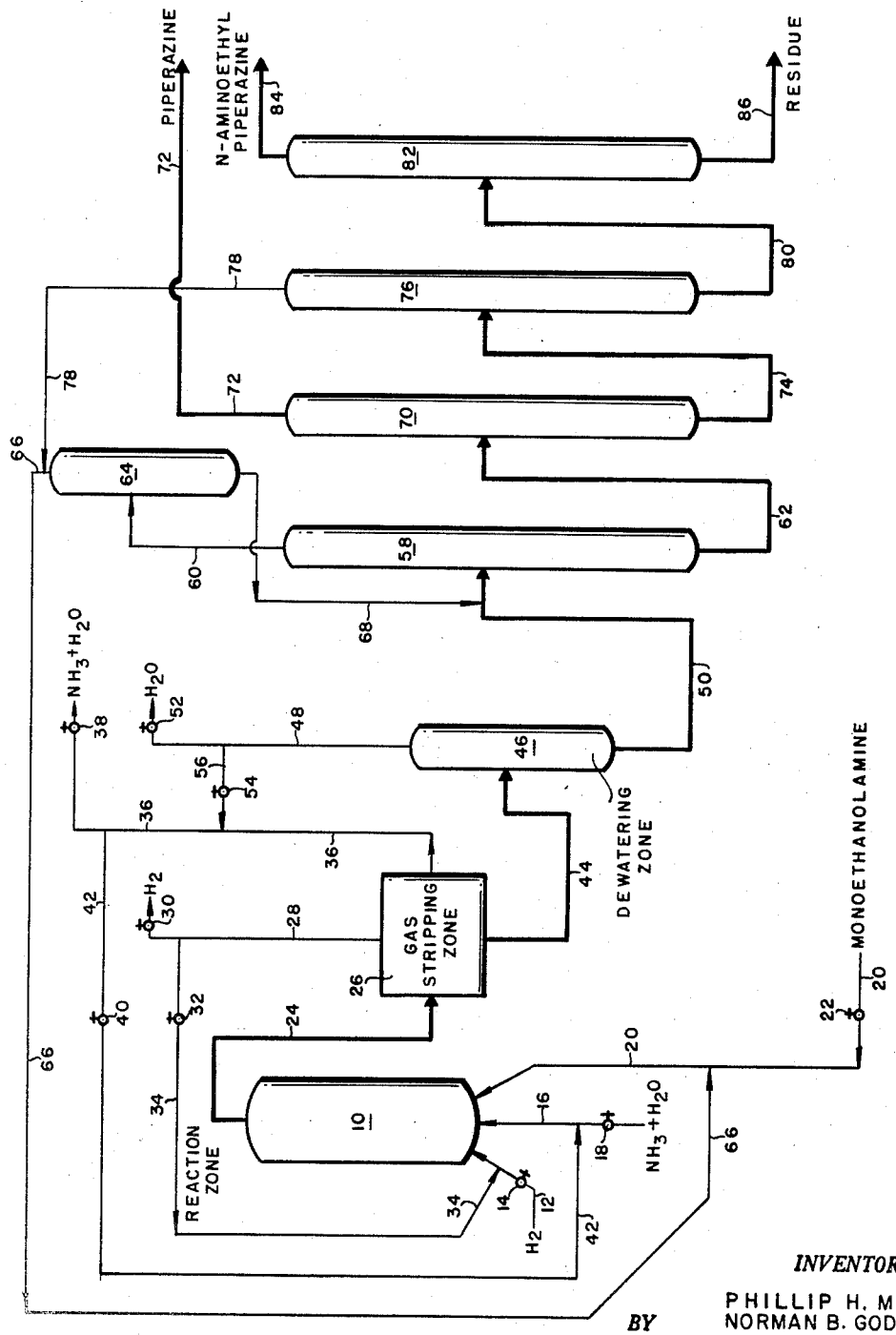
INVENTORS.
PHILLIP H. MOSS,
BY   NORMAN B. GODFREY,
ATTORNEY.

United States Patent Office 3,151,115
Patented Sept. 29, 1964

3,151,115
METHOD FOR THE SIMULTANEOUS PRODUCTION OF ACYCLIC AND POLYCYCLIC AMINES
Philip H. Moss and Norman Bell Godfrey, Austin, Tex., assignors to Jefferson Chemical Company, Inc., Houston, Tex., a corporation of Delaware
Filed May 26, 1961, Ser. No. 112,926
4 Claims. (Cl. 260—268)

This invention relates to a method for the simultaneous preparation of piperazine and 1-(2-aminoethyl)piperazine, hereinafter referred to as N-aminoethylpiperazine. This application is a continuation in part of copending application Serial No. 780,961, filed December 17, 1958, (now abandoned), which is, in turn, a continuation in part of application Serial No. 700,939, filed December 6, 1957 (now abandoned).

Processes for the preparation of heterocyclic ethylenic amines, such as piperazine, from monoethanolamine require comparatively severe catalytic reaction conditions in order to achieve ring closure. Thus, even under the best of conditions, a cyclizing reaction of this nature is characterized by poor selectivity in that the catalysts that are employed will normally promote not only the desired cyclization reaction, but also a wide variety of side reactions, including cracking reactions and condensation reactions that lead ultimately to the formation of a wide variety of acyclic and heterocyclic products. Thus, for example, when monoethanolamine is subjected to reductive amination at an elevated temperature and pressure in the presence of hydrogen and excess ammonia in contact with a hydrogenation catalyst, a wide variety of reaction products are formed. As a consequence, the reaction product will contain a large number of compounds including, but not limited to, the following:

TABLE I

Reaction Product Components

| Compound: | Boiling pt., °C. |
|---|---|
| Hydrogen | --- |
| Ammonia | --- |
| Water | 100 |
| N-methylethylenediamine | 115 |
| Ethylenediamine | 117 |
| N-ethylethylenediamine | 129 |
| 1-methylpiperazine | 135 |
| Piperazine | 145 |
| 1-ethylpiperazine | 156 |
| Monoethanolamine | 170 |
| Diethylenetriamine | 207 |
| N-aminoethylpiperazine | 221 |
| N-hydroxyethylpiperazine | 242 |
| 2-(2-aminoethylamino)-ethanol | 242 |
| Residue components | Above 250 |

The selectivity of the monoethanolamine starting material with respect to the above-identified reaction products is dependent upon a number of factors, including catalyst identity, reaction conditions, etc. Moreover, since the chemistry of the system is not understood, it is not possible to predict with precision the yields and selectivities that will be obtained, and largely empirical methods must be utilized if a reaction mixture is to be obtained which will contain the desired reaction products in maximized yield.

Of the various products that are formed by the reductive amination of monoethanolamine (as disclosed, for example, in copending Moss, et al., application Serial No. 662,998, filed June 3, 1957 and now Patent No. 3,037,023, and entitled "Process for Preparation of Piperazine"), two products of a heterocyclic nature are formed that have significant utility. These products are piperazine and N-aminoethylpiperazine.

In accordance with the present invention, it has been surprisingly discovered that a significant reduction in the yield of unwanted by-products can be achieved, and a maximum recovery of piperazine and N-aminoethylpiperazine can be obtained when monoethanolamine is brought into contact with a hydrogenation catalyst containing from about 90 to 100 wt. percent of a member selected from the group consisting of copper, cobalt, nickel, and mixtures thereof, and from about 10 to 0 wt. percent of a second component selected from the group consisting of chromium oxide, molybdenum oxide, manganese oxide, thorium oxide, and mixtures thereof, in the presence of from about 1 to about 6 mols of ammonia per mol of monoethanolamine under reductive amination conditions, including a temperature within the range of about 200° C. to about 260° C. and a pressure within the range of about 100 to about 400 atmospheres, including from about 60 to about 300 atmospheres partial pressure of hydrogen sufficient to obtain the conversion of at least 60% of the monoethanolamine to amine products.

The best results are obtained at a monoethanolamine conversion of about 75 to 95% while employing from about 2.5 to about 4.5 mols of ammonia per mol of monoethanolamine.

If more than about 6 mols of ammonia per mol of monoethanolamine are employed or if reaction conditions are adjusted to obtain less than about 60 mol percent conversion of monoethanolamine, the desired results of the present invention are not obtained. However, when monoethanolamine is subjected to reductive amination under the aforesaid conditions, a reaction mixture is obtained wherein the yields of both piperazine and N-aminoethylpiperazine are maximized.

Still further, however, the simultaneous recovery of substantially pure piperazine and substantially pure N-aminoethylpiperazine from the crude reaction product presents a number of problems because of the tendency of reaction product components to form azeotropes during distillation. In accordance with another aspect of the present invention, therefore, a method is provided for obtaining both substantially pure piperazine and substantially pure N-aminoethylpiperazine from a crude reaction product wherein the two materials are contained in significant amounts.

Thus, in accordance with the present invention, monoethanolamine is reacted with ammonia at an elevated temperature and a superatmospheric pressure in the presence of hydrogen and a hydrogenation catalyst, as set forth above, to produce a crude reaction mixture containing a wide variety of acyclic and heterocyclic amines, including piperazine and N-aminoethylpiperazine. After the removal of hydrogen, ammonia and a significant portion of the water, the substantially dewatered, crude reaction mixture is subjected to distillation at atmospheric pressure and at temperatures up to about 215° C. in order to provide a lower boiling recycle fraction, a piperazine product fraction, and a higher boiling recycle fraction, thereby leaving a mixture of high-boiling amines.

The high-boiling amine product, though valuable in itself, is subjected to further treatment in accordance with the present invention to obtain N-aminoethylpiperazine therefrom. For this purpose, the high-boiling amine product is charged to a fractionating column operated under a reduced pressure to obtain an overhead fraction consisting essentially of N-aminoethylpiperazine and a bottoms residue fraction.

The feed materials to be utilized in accordance with the present invention, are monoethanolamine, hydrogen, ammonia and, optionally, water.

Hydrogen is essential for the basic reaction and should amount to a substantial amount of the reaction atmosphere. As a rule, there is employed at least 60, such as between 60 and 250, atmospheres of hydrogen pressure. Preferably, the hydrogen partial pressure will amount to from about 60 to 80% of the total pressure.

The improved results of the present invention are obtained by conducting the reductive amination in the presence of a supported or unsupported hydrogenation catalyst containing, as the catalytically active ingredients thereof, from about 90 to about 100% of a first member selected from the group consisting of cobalt, copper, nickel, oxides thereof, and mixtures of metals and oxides thereof, and from about 10 to about 0 wt. percent of a second non-reducible metal oxide selected from the group consisting of chromium oxide, manganese oxide, molybdenum oxide and thorium oxide.

A preferred class of catalysts will consist essentially of nickel, copper and chromium oxides and, on an oxide-free basis, will contain 60 to 85 mol percent nickel, 14 to 37 mol percent copper and 1 to 5 mol percent chromium. Still more preferably, the catalyst will contain, on an oxide-free basis, 72 to 78 mol percent nickel, 20 to 25 mol percent copper and 1 to 3 mol percent chromium. A specific example of a preferred catalyst composition consists of about 75% nickel oxide, about 22% copper oxide and about 3% chromium oxide. It will be understood that the nickel and copper will be reduced to metallic form during the course of the reductive amination.

A support for the catalyst may be utilized if desired, such as, for example, gamma alumina, kieselguhr, etc.

The reaction temperature to be utilized in accordance with the present invention should be within the range of about 200° to about 260° C., and more preferably within the range of about 220° to about 250° C. The total reaction pressure may be within the range of 100 to 400 atmospheres and is more preferably within the range of about 200 to about 300 atmospheres.

Contact time can be varied within comparatively wide limits and may be a contact time corresponding to a feed rate from about 0.5 to about 5 pounds per hour of monoethanolamine per pound of catalyst.

It will be understood that the specific combination of reaction conditions to be employed within the above ranges will be selected so as to provide a conversion of at least 60%, such as a conversion of about 75 to about 95 percent of the monoethanolamine to amine product.

It is also within the scope of the present invention to utilize water as a feed material, with water constituting from about 15 to about 100 wt. percent of the total amine feed stock.

On completion of the basic reaction, the total reaction product is treated for the removal of hydrogen and excess ammonia. The normally liquid components that remain after this treatment are then significantly dewatered to provide a normally liquid amine product.

In accordance with the present invention, the amine product is subjected to atmospheric distillation in a first distillation zone to obtain a light distillate fraction comprising water, ethylenediamine, piperazine, N-alkylpiperazines and a first residue. The first residue is subjected to further atmospheric distillation in the second distillation zone to obtain a piperazine fraction, and the residue fraction from the second zone is subjected to distillation in a third distillation zone to obtain a recycle fraction comprising diethylenetriamine and monoethanolamine.

The residue from the third distillation zone may be characterized as a black, viscous, oily liquid having a hydroxyl number of about 5.8 and a molecular weight, according to Rast, of about 125.

The high-boiling residue is valuable without any further treatment. This product functions as a gas scrubbing agent and is valuable as a curing agent for epoxide resins. Epoxide resins may be illustrated by one class formed by the condensation of bisphenol "A" (2,2-di-p-hydroxyphenylpropane) with 2 parts of epichlorohydrin thereby producing a molecule having two terminal epoxy groups. 10 parts of the high-boiling amine product admixed with 100 parts of this type epoxy resin produced in about one hour an infusible, solid composition having a Barcol hardness of 30.

Preferably, however, the high-boiling amine residue from the third distillation zone is subjected to additional treatment in a vacuum distillation zone in order to obtain N-aminoethylpiperazine.

The 1-(2-aminoethyl)piperazine has a boiling point of 218° to 221° C. at 760 mm. of pressure. This material has been identified by combustion analysis. The analysis indicated 55.6% C, 11.7% H and 32.2% N (theoretical composition for $C_6H_{15}N_3$ is 55.87% C, 11.7% H and 32.5% N). The identification was confirmed when the material exhibited an infrared absorption curve identical to that traced out by a sample of 1-(2-aminoethyl)piperazine prepared from ethyleneimine and piperazine.

1-(2-aminoethyl)piperazine is a good curing agent for epoxy resins. When 10 parts of 1-(2-aminoethyl)-piperazine were mixed with 100 parts of the epoxy resin described above, the resin was cured to a Barcol hardness of 23 in one hour's time.

The bottoms removed from the fractionation consist essentially of 1-piperazineethanol, 2-(2-aminoethylamino)-ethanol and higher boiling amines.

The invention will be further illustrated in connection with the accompanying drawing wherein the figure is a schematic flow sheet illustrating a preferred embodiment of the present invention.

Turning now to the drawing, there is schematically shown a reaction zone 10 containing a bed of a catalyst containing copper, nickel and chromium, and obtained by the hydrogen reduction of a catalyst comprising about 75 wt. percent manganese oxide, about 22% copper oxide and about 3% chromium oxide.

At the beginning of the operation, hydrogen is charged to reaction zone 10 by way of a charge line 12 controlled by a valve 14; ammonia and water are charged by way of line 16 controlled by valve 18 and monoethanolamine is charged by way of a line 20 controlled by a valve 22.

Charge rates and conversion conditions to be employed in the reaction zone 10 are those set forth above.

As a consequence of the reaction, a reactor effluent discharged by way of a line 24 is obtained which comprises hydrogen, ammonia, water and a plurality of amines, including ethylenediamine, piperazine, aminoethyl-piperazine, diethylenetriamine, monoethanolamine and higher derivatives of the foregoing amines comprising a residue.

The reactor effluent is charged by way of a line 24 to a gas stripping zone 26 operated in any desired manner in order to obtain a hydrogen fraction discharged by way of a line 28 controlled by a valve 30. Preferably, the valve 30 is closed and a valve 32 and a branch line 34 leading to hydrogen charge line 14 is opened whereby, on a lined out basis, fresh hydrogen is charged to the process through line 12 on a replacement basis only.

In like fashion, water and ammonia are removed from zone 26 by way of a line 36 controlled by a valve 38. However, it is preferable to recycle at least a portion of the water and ammonia by closing valve 38 and opening a valve 40 in a line 42 leading to a charge line 16 whereby, on a lined out basis, ammonia and water will be charged to line 16 on a replacement basis only.

The thus de-gassed normally liquid reaction components are discharged from zone 26 by way of a line 44 leading to a dewatering zone 46, which may comprise, for example, a distillation column.

The normally liquid reaction components in line 44 will normally contain a significant amount of water (e.g., from about 10 to about 50 wt. percent of water). As a consequence, an appreciable amount (e.g., from about 5 to 10 wt. percent) of ammonia will remain dissolved.

Within the zone 46, distillation conditions are adjusted so as to obtain a distillate water fraction 48 containing most of the water and all of the dissolved ammonia and a bottoms amine fraction 50 containing most of the amine components of the reaction mixture, but also, from about 5 to 15 wt. percent of water.

Distillate water in line 48 may be discharged from the system by opening valve 52 in line 48. Alternately, all or part of the water may be recycled by adjusting the setting of valve 54 in a branch line 56 leading to the line 36.

As indicated, the bottoms fraction 50 will contain not only amines by also a significant quantity of water. This should be the case, because a number of the amine components form azeotropes with water whereby substantially complete dewatering of the stream 44 would result in the carry-over of significant quantities of amines into the distillate line 48.

In accordance with the present invention, the amine fraction 50 is charged to a primary distillation zone 58, which is preferably an atmospheric distillation zone, in order to obtain a light distillate fraction 60 and a bottoms fraction 62. Fractionation conditions in zone 58 are preferably adjusted so as to provide a distillate fraction which will contain from about 20 to 40 wt. percent of piperazine. As a consequence, the distillation fraction 58 will contain all of the water, N-methylpiperazine and N-ethylpiperazine present in the fraction 50 and most of the ethylenediamine.

Distillate fraction 60 is separated, preferably in a splitter column 64, into a distillate fraction 66 comprising water, ethylenediamine, most of the N-alkylpiperazines and less than 10 wt. percent of piperazine; fraction 66 is preferably recycled to the monoethanolamine charge line 20 for the reaction zone 10.

The bottoms fraction 68 from splitter column 64 will contain most of the piperazine initially present in distillate fraction 60, together with a significant quantity of ethylenediamine and minor amounts of water and the N-alkylpiperazines. This fraction is preferably recycled to the charge line 50 for the distillation zone 58.

The bottoms fraction 62 from column 58 is preferably charged to a second distillation zone 70, which is preferably an atmospheric distillation zone, wherein distillation conditions are adjusted so as to obtain a substantially pure piperazine distillate fraction 72 containing less than about 1 wt. percent of water and ethylenediamine and no N-alkylpiperazines. The bottoms fraction 74 from the second distillation column 70 is preferably charged to a third atmospheric distillation zone 76, which is operated under distillation conditions so as to obtain a distillate fraction 78 comprising not only monoethanolamine but also diethylenetriamine. The fraction 78 is preferably charged to the recycle line 66 from zone 64 leading to the charge line 20 for the reaction zone 10.

The bottoms fraction 80 from distillation zone 76 is charged to a fourth distillation zone 82 which is preferably a vacuum distillation zone wherein the fraction is separated into a substantially pure N-aminoethylpiperazine distillate fraction 84 and a residue fraction 86.

The invention will be further illustrated by the following specific examples which are given by way of illustration and not as limitations on the scope of this invention.

EXAMPLES 1–5

In a Dowtherm heated reactor containing 15 gallons of nickel-copper-chromia catalyst and formed into pellets, monoethanolamine and ammonia were allowed to react under the conditions shown below. The catalyst was prepared by hydrogen reduction of a mixture of 75 mol percent nickel oxides, 23 mol percent copper oxides and 2 mol percent chromium oxides whereby metallic nickel and metallic copper and chromium oxides were present in the catalyst charged to the reactor.

|  | 1 | 2 | 3 | 4[1] | 5[1] |
|---|---|---|---|---|---|
| Reactor temp., °C | 199 | 198 | 198 | 223 | 227 |
| Hydrogen rate: SCFH | 800 | 800 | 800 | 800 | 800 |
| Reaction press., p.s.i.g | 2,800 | 2,800 | 2,800 | 2,800 | 2,800 |
| Feed rates, gal./hr.: |  |  |  |  |  |
| NH₃ (anhydrous) | .94 | .70 | .47 | .80 | .80 |
| Monoethanolamine (MEA) | 35.5 | 25.5 | 16 | 158 | 158 |
| NH₃/MEA mol. ratio | 5.6 | 5.8 | 6.2 | 1.1 | 1.1 |
| Space velocity, g./hr., ml. cat | 6.2 | 4.5 | 3.0 | 3.1 | 3.1 |
| Conversion of MEA, percent | 29.3 | 39.8 | 53.8 | 71.4 | 75.4 |
| Yields (molar), percent: |  |  |  |  |  |
| Ethylene diamine (EDA) | 41.3 | 38.5 | 36.2 | 12.0 | 15.0 |
| Piperazine (PIP) | 13.7 | 18.7 | 23.2 | 47.6 | 58.0 |
| Diethylenetriamine (DETA) | 7.1 | 7.6 | 9.3 | 9.0 | 3.3 |
| N-Aminoethylpiperazine (AEP) | 2.1 | 3.0 | 3.0 | 15.0 | 17.5 |
| Aminoethylethanolamine (AEEA) | 23.3 | 18.4 | 13.2 |  |  |
| Hydroxyethylpiperazine (HEP) | 0.5 | 2.2 | 3.2 | 6.0 | 3.5 |
| Residue | 12.0 | 11.6 | 11.9 | 10.4 | 2.7 |
| Pip. + AEP | 15.8 | 21.7 | 26.2 | 62.6 | 75.5 |

[1] Also used 140 gal. water/hr. in feed.

It will be observed that by-products were minimized by the practice of the present invention, as evidenced by Examples 4 and 5.

EXAMPLES 6–8

Into a 1400 ml. rocking autoclave was added 100 g. of monoethanolamine, 50 g. of catayst and 100 ml. of water. In this case, however, the catalyst consisted of metallic cobalt. The autoclave was assembled and the contents flushed with hydrogen. Then 100 g. of anhydrous ammonia was added and hydrogen added to 500 p.s.i.g. The contents were heated to 220° C. and held at this temperature for one hour (pressure 2000 p.s.i.g.). After removing the catalyst the product was analyzed by vapor chromatography. The following results were obtained.

| Run No | 6 | 7 | 8 |
|---|---|---|---|
| Conversion of MEA, percent | 54.3 | 75.3 | 96.7 |
| Yield of pip., percent | 15.8 | 25.6 | 36.4 |
| Yield of EDA, percent | 24.8 | 21.0 | 5.9 |
| Yield of AEP | 7.0 | 5.6 | 10.7 |
| Yield of HEP |  | 4.2 | 4.8 |
| Yield of AEP + pip | 22.8 | 31.2 | 47.1 |

It will be observed in this situation, and with a cobalt catalyst, that there was a significantly lower yield of both piperazine and N-aminoethylpiperazine as compared with Examples 1–5, wherein the preferred catalyst of the present invention was employed.

EXAMPLE 9

A Dowtherm heated reactor was charged with 25 gallons of a nickel-copper-chromia catalyst (the same proportions as Example 1) supported on diatomaceous earth and formed into pellets. Monoethanolamine and ammonia were reacted in the reactor in a hydrogen atmosphere. The monoethanolamine and ammonia in a 1:3 mol ratio were pumped up through the catalyst bed at a rate of 32 gallons of monoethanolamine per hour. The pressure was maintained at 3000 p.s.i.g. (pounds per square inch gauge) and a temperature at 240° to 256° C. The crude reaction product, free of ammonia and hydrogen, was distilled at 50 mm. at temperatures up to 150° C. Materials boiling below this temperature were removed leaving a high-boiling amine product amounting to 35.6% of the reaction product.

The high-boiling amine product was then distilled at 10 mm. of mercury absolute at temperatures up to 138° C.

and the overhead distillate refractionated through an efficient column. The following products were obtained:

| Material | Percent of amines boiling above monoethanolamine | B.P. at 760 mm. °C. |
|---|---|---|
| Diethylenetriamine | 4.3 | 207 |
| 1-(2-aminoethyl)piperazine | 12.8 | 218–221 |
| 1-piperazineethanol and 2-(2-aminoethylamino)ethanol | 39.5 | 240–244 |
| Undistilled amines | 43.4 | |

EXAMPLE 10

1242 grams of ethylene glycol, 1000 grams of water and 200 grams of prereduced copper-nickel-chromium catalyst (30 atom percent nickel, 64 atom percent copper, 6 atom percent chromium) were placed in a 3 liter stainless steel autoclave bomb which was then closed and purged with hydrogen. 1700 grams of ammonia were added under pressure followed by hydrogen to make the total pressure 500 p.s.i.g. at 39° C. The mixture was reacted at 250° to 257° C. for 2 hours. The crude reaction product was distilled at 50 mm. and at temperatures up to 150° C. to remove all of the material boiling below this temperature, thereby leaving a high-boiling amine product.

The high-boiling amine product was subjected to further distillation at 20 mm. of mercury pressure absolute to produce a minor amount of ethylene glycol, a 14.4% yield of 1-2-aminoethyl)piperazine and 29.3 grams of 1-piperazineethanol and 2-(2-aminoethylamino)ethanol in admixture together with a higher boiling amine residue.

EXAMPLE 11

In a series of continuous runs with the same catalyst at 270° C. and 2700 p.s.i.g., in which the mol ratio of ammonia to monoethanolamine was varied, the following results were obtained.

| Run No | 10 | 11 | 12 |
|---|---|---|---|
| Mol ratio NH₃:MEA | 1 | 3 | 15 |
| Conversion to: | | | |
| Ethylenediamine, percent | 3.9 | 4.0 | 7.4 |
| Piperazine, percent | 4.2 | 5.3 | 4.8 |
| Residue, percent | 13.5 | 11.5 | 8.0 |
| Total conversion of MEA, percent | 21.6 | 20.8 | 20.2 |

In this series of runs the catalyst in Example 1 was employed and the hydrogen partial pressure amounted to about 400 atmospheres.

EXAMPLE 12

A copper-chromia catalyst prepared by reducing with hydrogen 10 grams of a pulverized commercial catalyst containing 84% CuO and 15% Cr₂O₃ was introduced into a bomb together with 122 grams monoethanolamine and 68 grams anhydrous ammonia. The bomb was pressured with hydrogen to 675 p.s.i.g., heated to 220° C. and held there for one hour with agitation. After distilling off low-boiling products and unreacted monoethanolamine in the presence of 45 grams added diethylene glycol monomethyl as a chaser, there remained a residue containing a 56% yield of high-boiling amines, calculated as aminoethylethanolamine by titration.

The amine residues of this invention exhibit valuable properties as demulsifiers. They may be employed to break emulsions formed when crude oil is produced along with water or brine or to break water-oil emulsions formed in petroleum refining processes.

Having thus described my invention, what is claimed is:

1. A method for obtaining piperazine and N-aminoethylpiperazine from monoethanolamine in maximized yield which comprises the steps of contacting monoethanolamine with a hydrogenation catalyst in a reaction zone in the presence of hydrogen and from about 1 to about 6 mols of ammonia per mol of monoethanolamine under reaction conditions including a temperature within the range of about 200° to about 260° C., a pressure within the range of about 100 to about 400 atmospheres and a contact time within the range of about 0.5 to about 5 hours sufficient to convert at least 60% of said monoethanolamine to amine products and to thereby provide a reaction mixture comprising hydrogen, ammonia, water and normally liquid amines, including unreacted monoethanolamine, piperazine, N-methylpiperazine, N-ethylpiperazine, ethylenediamine, N-aminoethylpiperazine, diethylenetriamine and residue components, and separately recovering piperazine and N-aminoethylpiperazine from said reaction mixture, said hydrogenation catalyst comprising, as the catalytically active material, 90 to 100 wt. percent of a first component selected from the group consisting of nickel, cobalt, copper, and mixtures thereof, and 10 to 0 wt. percent of a second component selected from the group consisting of chromium oxides, molybdenum oxides, manganese oxides, thorium oxides, and mixtures thereof, said reaction pressure including a hydrogen partial pressure of 60 to 300 atmospheres amounting to from about 60% to about 80% of the total pressure.

2. A method for obtaining piperazine and N-aminoethylpiperazine from monoethanolamine in maximized yield which comprises the steps of contacting monoethanolamine with a hydrogenation catalyst in a reaction zone in the presence of hydrogen and from about 2.5 to about 4.5 mols of ammonia per mol of monoethanolamine under reaction conditions including a temperature within the range of about 220° to about 250° C., a reaction pressure within the range of about 200 to about 300 atmospheres and a contact time within the range of about 0.5 to about 5 hours sufficient to convert from about 75% to about 95% of said monoethanolamine to amine products and to thereby provide a reaction mixture comprising hydrogen, ammonia, water and normally liquid amines, including unreacted monoethanolamine, piperazine, N-methylpiperazine, N-ethylpiperazine, ethylenediamine, N-aminoethylpiperazine, diethylenetriamine and residue components, and separately recovering piperazine and N-aminoethylpiperazine from said reaction mixture, said hydrogenation catalyst comprising nickel, copper and chromium oxides and containing, on an oxide-free basis, from about 60 to 85 mol percent nickel, from about 14 to about 37 mol percent copper and from about 1 to about 5 mol percent of chromium, said reaction pressure including a hydrogen partial pressure amounting to from about 60% to about 80% of the total pressure.

3. A continuous method for obtaining piperazine and N-aminoethylpiperazine from monoethanolamine in maximized yield which comprises the steps of continuously contacting monoethanolamine with a hydrogenation catalyst in a reaction zone in the presence of hydrogen and water and from about 1 to about 6 mols of ammonia per mol of monoethanolamine under reaction conditions including a temperature within the range of about 200° to about 260° C., a pressure within the range of about 100 to about 400 atmospheres and a contact time within the range of about 0.5 to about 5 hours sufficient to convert at least 60% of said monoethanolamine to amine products and to thereby provide a reaction mixture comprising hydrogen, ammonia, water and normally liquid amines including unreacted monoethanolamine, piperazine, N-methylpiperazine, N-ethylpiperazine, ethylenediamine, N-aminoethylpiperazine, diethylenetriamine and residue components, recovering an aqueous normally liquid amines fraction from said reaction mixture separating said normally liquid amines fraction in an atmospheric distillation zone into a first distillate fraction comprising water, ethylenediamine, piperazine, N-methylpiperazine and N-ethylpiperazine, a second distillate fraction consisting essentially of piperazine, a third distillate fraction comprising diethylenetriamine and monoethanolamine and a residue fraction comprising N-aminoethylpiperazine, subjecting said residue fraction to vacuum distillation under conditions to obtain an N-aminoethylpiperazine distillate product fraction and a second residue fraction, and recycling said third distillate fraction and at least a portion of said first distillate fraction to said reaction zone, said hydrogenation catalyst comprising, as the catalytically active material, 90 to 100 wt. percent of a first component selected from the group consisting of nickel, cobalt, copper, and mixtures thereof, and 10 to 0 wt. percent of a second component selected from the group consisting of chromium oxides, molybdenum oxides, manganese oxides, thorium oxides, and mixtures thereof, said reaction pressure including a hydrogen partial pressure of 60 to 300 atmospheres, amounting to from about 60% to about 80% of the total pressure, the amount of water being within the range from about 15 to about 100 wt. percent, based on the amine charge.

4. A continuous method for obtaining piperazine and N-aminoethylpiperazine from monoethanolamine in maximized yield which comprises the steps of continuously contacting monoethanolamine with a hydrogenation catalyst in a reaction zone in the presence of hydrogen and water and from about 2.5 to about 4.5 mols of ammonia per mol of monoethanolamine under reaction conditions including a temperature within the range of about 220° to about 250° C., a pressure within the range of about 200 to about 300 atmospheres and a contact time within the range of about 0.5 to about 5 hours sufficient to convert from about 75% to about 95% of said monoethanolamine to amine products and to thereby provide a reaction mixture comprising hydrogen, ammonia, water and normally liquid amines, including unreacted monoethanolamine, piperazine, N-methylpiperazine, diethylenetriamine and residue components, recovering from said reaction mixture an aqueous normally liquid amines fraction containing from about 5 to about 15 wt. percent of water, separating said aqueous normally liquid amines fraction in a first atmospheric pressure distillation zone into a first distillate fraction containing water, dissolved ammonia, N-methylpiperazine, N-ethylpiperazine, ethylenediamine and 20% to 40% piperazine and a first bottoms fraction, separating said first distillate fraction in a second atmospheric pressure distillation zone into a second distillate fraction comprising water, ammonia, N-methylpiperazine and N-ethylpiperazine and a second bottoms fraction, recycling said second distillate fraction to said reaction zone, recycling said second bottoms fraction to said first distillation zone, separating said first bottoms fraction in a third atmospheric pressure distillation zone into a light distillate fraction consisting essentially of piperazine, an intermediate distillate fraction comprising monoethanolamine and diethylenetriamine and a third residue fraction, recovering said piperazine fraction, recycling said intermediate distillate fraction to said reaction zone and subjecting said third residue fraction to vacuum distillation in a vacuum distillation zone to obtain a residue fraction and a vacuum distillate fraction consisting of N-aminoethylpiperazine and recovering said N-aminoethylpiperazine, said hydrogenation catalyst comprising nickel, copper and chromium oxides and containing, on an oxide-free basis, from about 60 to 85 mol percent nickel, about 14 to about 37 mol percent copper and from 1 to about 5 mol percent of chromium, said reaction pressure including a hydrogen partial pressure of 60 to 300 atmospheres amounting to from about 60% to about 80% of the total pressure, the amount of added water being within the range from about 15 to 100 wt. percent, based on the amine charge.

References Cited in the file of this patent
UNITED STATES PATENTS
3,037,023      Moss et al. _____ May 29, 1962